Figure 1:
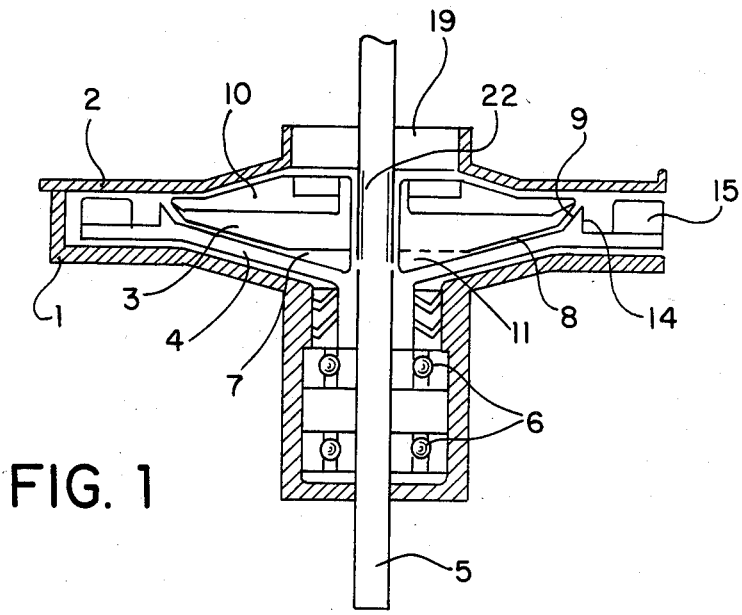

United States Patent [19]

Appelgren et al.

[11] Patent Number: 4,690,834

[45] Date of Patent: Sep. 1, 1987

[54] PROCESS FOR COATING SOLID PARTICLES

[76] Inventors: Curt H. Appelgren, Benjaminssons väg, Pl 1461, S-434 00 Kungsbacka; Nemo Ivarsson, Skönviksvägen 253, S-122 42 Enskede, both of Sweden

[21] Appl. No.: 890,735

[22] Filed: Jul. 30, 1986

[51] Int. Cl.⁴ .................... B05D 7/00; B29C 67/00; C09C 1/56; A01N 25/00
[52] U.S. Cl. .................... 427/189; 71/64.02; 118/19; 118/303; 264/117; 427/212; 427/220; 427/242
[58] Field of Search .............. 71/64.02; 118/19, 303; 264/117; 425/222; 427/212, 220, 242, 189, 425; 366/176, 263, 264, 265

[56] References Cited

U.S. PATENT DOCUMENTS

| | | | |
|---|---|---|---|
| 3,348,938 | 10/1967 | Sherrington et al. | 71/64.02 X |
| 3,991,225 | 11/1976 | Blouin | 71/64.02 X |
| 4,353,852 | 10/1982 | Tse | 264/37 |
| 4,596,206 | 6/1986 | Berge et al. | 427/212 X |

Primary Examiner—Michael R. Lusignan
Attorney, Agent, or Firm—Burns, Doane, Swecker & Mathis

[57] ABSTRACT

The present invention relates to a process for coating solid particles using a material being highly viscous or solid at room temperature, whereby a melt of a material being highly viscous or solid at room temperature, and the particulate material, to be coated, respectively, are introduced via separate conduits (19,22) to a hollow space (7) in a rotating mixing disc (3,4), and one or more spaces (13) for a solid material in said mixing disc (3,4) respectively, and are swept by the centripetal force outwardly toward the periphery of the disc (3,4), whereby the melt is pressed from its hollow space (7) via a slot (9) in the disc (3,4) in a direction towards the upper side of the disc (3,4) and thereby forms a finely dispersed melt in the form of small droplets creating a mist, which meets the particulate solid material being swept outwardly by the centripetal force, and is attached to the surface of said material to the formation of an unbroken coating of a material being highly viscous or solid at room temperature around said material.

13 Claims, 3 Drawing Figures

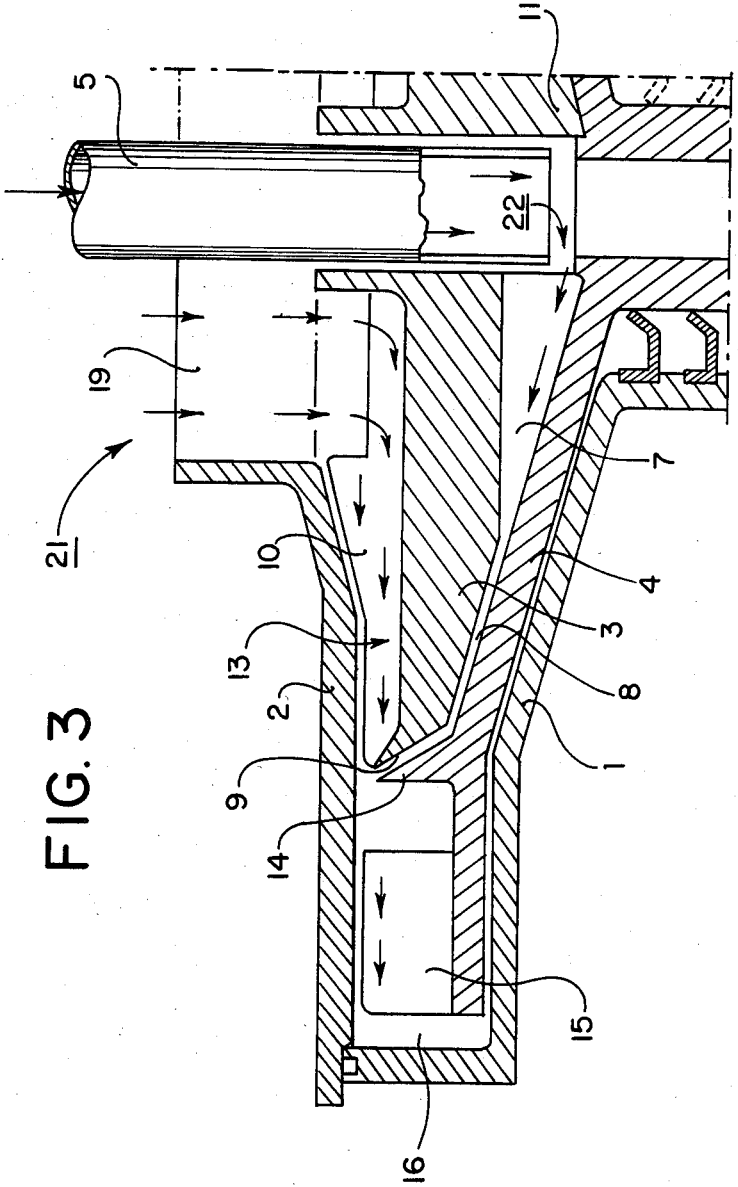

4,690,834

PROCESS FOR COATING SOLID PARTICLES

DESCRIPTION

Technical field

The present invention relates to a process for coating solid particles using a material which is highly viscous or solid at room temperature. The term coating, hereby relates to embedment, and/or surface coating.

The object of the present invention is to obtain the possibility of providing, in a simple and rational way, solid particles with a coating of a material which is highly viscous or solid at room temperature, which material is liquid and low viscous at an elevated temperature.

The aim is hereby to obtain products, preferably of a particulate form having a diameter of 0.5 to 1.5 mm, which are protected against moisture; are masked against bad taste; are protected against heat; are protected against dissolution, at one pH range in order to be dissolved at another pH range, In the latter case, pharmacentically active compositions can be protected against the acid pH of the gastric juice, in order to be dissolved at a higher pH in the intestine, or obtain a rumen-by-pass by coating using a substance which is insensitive to the pH of the rumen but not to the lower pH available in the subsequent gastro-intestinal system of a ruminant.

BACKGROUND OF THE INVENTION

It is previously known to have a granulator for granulation, or coating a solid material with a film forming material dissolved in a solvent. The granulator comprises a rotating disc, which is arranged in a cylindrical housing, whereby the disc is arranged at a certain distance from the cylindrical wall to a slot, through which air is blown in order to create turbulence of a solid material being introduced at the upper side of the disc. The material is simultaneously sprayed from a spraying nozzle arranged above the disc. The apparatus and the method related thereto means that the coating material is added only at one point in the chamber, which leads to undesired agglomeration effects depending on too a high moisture at the point of application. The device is known under the mark CF-360; CF-750; CF-1000; and CF-1300 (FREUND). Equivalent results are also obtained at methods using a fluidized bed for coating.

Further, it is known to have a device for homogeneously moistening of a solid material (SE-B-7903053-2), wherein a method and an apparatus are shown for continuous mixing of a liquid and a powder to form a mixture which is homogeneously moistured. In the device liquid and powder are fed through separate conduits to a hollow space in a rotation disc, and a powder space of the rotation disc, respectively, and are thereby swept by the centripetal force outwardly toward the periphery of the disc. The liquid is pressed from the hollow space via a slot in the disc in a direction to the upper side of the disc and creates a mist curtain at the outlet from the slot. This mist curtain is caught by the powder being swept outwardly by the centripetal force from the powder space, and forms part of, and makes up a homogenous mixture of this powder.

DESCRIPTION OF THE PRESENT INVENTION

It has now surprisingly been shown possible to coat a solid material with a material which is highly viscous or solid at room temperature using an apparatus of the above mentioned SE-B-7903053-2, whereby the present process is characterized in that a melt of a material which is highly viscous or solid at room temperature, and the particulate solid material to be coated, respectively, are introduced via seperate conduits to a hollow space in a rotating mixing disc, and one or more spaces for a solid material in said mixing disc, respectively, and are swept by the centripetal force outwardly towards the periphery of the disc, whereby the melt is pressed from its hollow space via a slot in the disc in a direction towards the upper side of the disc, thereby forming a finely dispersed melt in the form of small droplets creating a mist, which meet the particulate solid material being swept outwardly by the centripetal force, and is attached to the surface of this material and forms an unbroken coating of a material which is highly viscous, or solid at room temperature around the solid material.

The term highly viscous material includes a material which at room temperature has the form of a solid material, but as per physical-chemical definition is to be regarded as a liquid. The term solid material indicates a material which has such a structure that it is regarded as solid. As a rule the latter material has a relatively well defined melting point, or at least a very narrow melting range, while the highly viscous material does not show a defined melting point, but, at an increase of the temperature, turns into a low viscosity liquid. Both materials are hereby called melts, although it is a somewhat inappropriate definition in the latter case.

Materials being suited as melts are waxes, fatty acids, and fats of the mono, di or triglyceride types, having a melting point above 40° to 50° C. or higher. When coated, solid materials suitable for administration to animals and humans should have a coating which should be solid at a temperature below at least 40° C., preferably below 50° C.

By means of the present invention, a coating of solid material can take place without using a solution of the coating material in an organic solvent, which means very great advantages with regard to hygienic as well as safety regulations.

The invention will be described in detail in the following with reference to the accompanying drawing in which one embodiment of an apparatus for carrying out the present process is schematically shown as an example.

Figure 2:
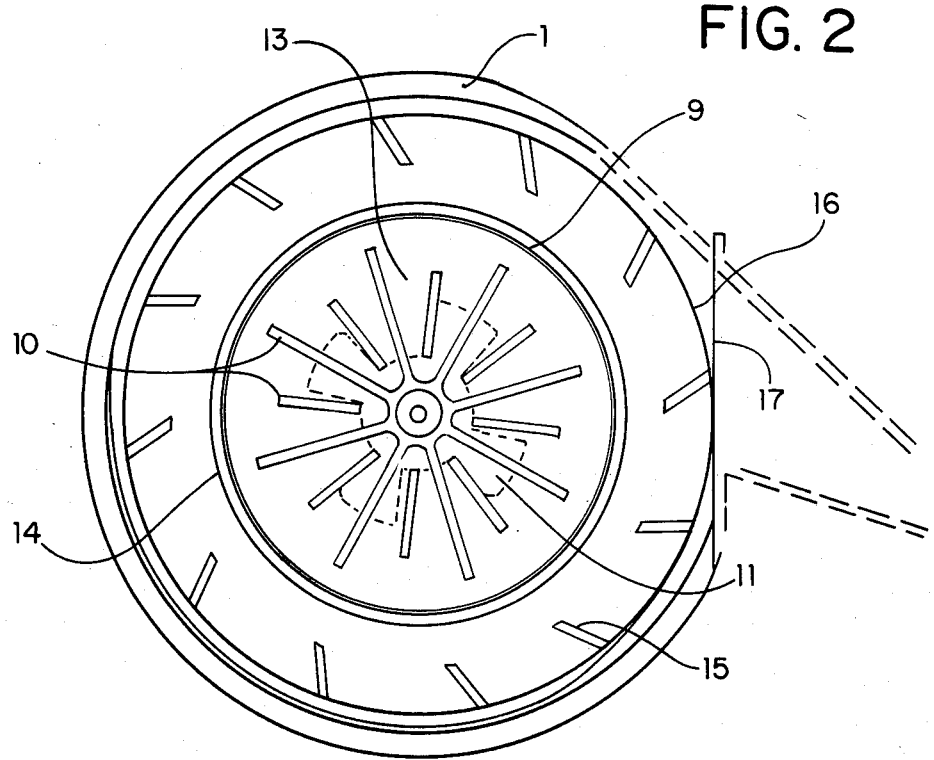

FIG. 1. shows a vertical cross section of the apparatus of SE-B-7903053-2;

FIG. 2. shows a cross-section of line II—II in FIG. 1.

FIG. 3. shows part of the vertical cross-section of FIG. 1 greatly magnified.

The apparatus of the drawing comprises a mixing housing 1, provided with a cover 2. Within the housing 1 a disc is arranged, which disc consists of an upper disc 3 and a lower disc 4, which disc is rotatably mounted around a shaft 5 by means of a bearing 6. Between the upper, and lower discs 3, and 4, respectively, there is a hollow space 7 which is connected to the upper side of the upper disc 3 via an annular slot consisting of two parts 8, and 9, which both take the shape of a circumferential surface of a cut cone with its point directed downwardly. The upper disc 3 has blades 10 cut on its upper side, and, optionally, cut, or mounted blades 11 on its side underneath. Between the blades 10 spaces 13 exist which are intended to receive particles to be coated while the space 7, which is optionally divided into compartments by means of the blades 11, is intended to receive the melt which is to be used for coating. The lower disc 4 is provided with an edge 14 extending around it close to the opening of the slot 9. At its periphery the lower disc 4 is provided with blades 15 for throwing out the final product via a diffuser 16 and an outlet 17. The cover 2 is provided with a compartment 19 placed above the centre of the disc which compartment 19 is arranged to receive the particulate solid material for a further transport of this to the compartments 13. The particulate solid material is fed to the compartment 19 by means of a transporting device 21, e.g. a feeding screw. The liquid phase is fed to the space 7 via a tube 22.

At the coating operation the discs 3,4 are rotated within the housing 1,2 around the shaft 5 with a revolving speed of between 1000 to 5000 rpm. A suitable peripheral speed using a disc diameter of 300 mm is 1500 to 5000 m per minute, whereby the lower speed is used for embedment/agglomeration and the higher for coating. The coating melt is thereby fed to the apparatus via the tube 22 to the hollow space 7. The tube 22 is hereby provided with heating means in order to keep the material in melted form all the time. By means of the centripetal force and the blades 11 the melt is thrown outwardly through the slot 8 and further through the slot 9. The melt hereby takes the form of a membrane which extends outwardly all the time simultaneously as it becomes thinner. When the melt leaves the slot 9 the membrane is torn up into very small droplets when it leaves the edge 14, whereby a mist curtain of droplets having a microscopic size, are formed. Simultaneously with the addition of melt through the tube 22 a particulate material is added by means of the transporting device 21 to the compartment 19 and further on to the compartments 13. From there the particulate material is thrown, by means of the centripetal force, and the blades 10, outwardly towards the periphery of the upper disc 3, simultaneously as it is deagglomerated/-disintegrated into primary particles, which meet with and pass the mist curtain at the edge 14. The particles hereby obtain a surface coating of the melt, and are further thrown outwardly to the blades 15, which throws the product out of the apparatus via the diffuser 16 and the outlet 17. Depending on the number of blades 15, their height, and the through-put, which can be varied using the outlet area, one can get an agglomeration of the particles, or get the particles out as separate, individually coated particles.

The process of the present invention means that particles can be embedded very simply into microunits; that microencapsulation can be carried through without using any solvent for the coating material.

By means of the present invention small particles can easily be provided with a coating, whereupon they, together with tabletting constituents can form a tablet which can easily disintegrate and rapidly release these minute particles which, dependent on the coating material, can have different solubility profiles.

The process means also that pulverulent material can easily be coated in order to modify the pulverulent material in order to, e.g., improve its mixing properties, and/or tabletting properties. Further, readily soluble powders can be agglomerated and be provided with a coating to provide an easy wetting at the dispersion/-mixing with a liquid.

By means of the present invention, one can protect heat-sensitive products from decomposition in a subsequent operation where heat is present, e.g., in pelletizing, and extruding operations.

In the present process the residence time is so short that even very heat-sensitive materials can be treated. The residence time in the mist curtain of melt is only a fraction of a second. Thus $NaHCO_3$ can be readily coated using a melt without causing any decomposition of the hydrogen carbonate.

By means of the present invention, grain can be simply provided with a coating comprising a pesticide, or fungicide or the like.

Other larger products which can be coated are grains of rice in a puffed state, which can be provided with a coating of e.g. chocolate.

The present invention means that an optimal contact surface is created before the particle and melt meet with each other, which per se guarantees a very high quality of the coating obtained. In the device described above the melt is introduced from above through the hollow central shaft. It is, however, evident that the melt can be introduced from below through the central shaft, as well.

The blades 10 of the drawing above should not extend all the way up to the edge 14 to provide for a completely homogenous coating. In the case the blades 10 extend all the way up to the edge 14, the solid material will leave them as a spray which leads to an inhomogenous coating.

We claim:

1. A process for coating solid particles with a coating material which is highly viscous or solid at room temperature comprising:
   (a) introducing the coating material in the form of a melt via a conduit to a hollow space in a rotating mixing disc;
   (b) introducing the solid particles via a separate conduit to at least one separate space in said rotating mixing disc; and
   (c) rotating the mixing disc to sweep the solid particles and the melt to the periphery of the mixing disc, the melt being forced from the hollow space through a slot in the mixing disc in a direction toward the upper surface of the disc so that the melt becomes a finely dispersed mist which contacts and forms a coating on the solid particles.

2. The process of claim 1 wherein the solid particles are introduced at a high throughput such that the solid particles are agglomerated or embedded.

3. The process of claim 1 wherein the solid particles are introduced a low throughput such that the solid particles are individually coated and are recovered as discrete particles.

4. The process of claim 1 wherein the coating material is introduced into the hollow space through a rotating shaft which rotates the rotating mixing disc.

5. The process of claim 4 wherein the coating material is heated in the shaft to help maintain the coating material as a melt.

6. The process of claim 1 wherein the solid particles are guided by blades located on the upper surface of the mixing disc.

7. The process of claim 1 wherein the coated solid particles are passed through a diffuser prior to being passed to an outlet.

8. The process of claim 1 wherein the mixing disc is rotated at between 1,000 and 5,000 rpm.

9. The process of claim 1 wherein the mixing disc is rotated to achieve a peripheral speed of between 1,500 and 5,000 meters per minute.

10. The process of claim 1 wherein the coating material has a melting point below 50° C.

11. The process of claim 10 wherein the coating material is selected from the group consisting of waxes, fatty acids and mono, di or triglyceride fats.

12. The process of claim 1 wherein the coating material is a pesticide or fungicide.

13. The process of claim 1 wherein the solid particles are composed of sodium bicarbonate.

* * * * *